United States Patent
Dokonal et al.

(10) Patent No.: US 9,013,086 B2
(45) Date of Patent: Apr. 21, 2015

(54) STATOR FOR AN ELECTRIC MOTOR INCLUDING SEPARATELY FORMED END PIECES AND ASSOCIATED METHOD

(75) Inventors: Luiz V. Dokonal, Joinville (BR);
Evandro J. Meurer, Joinville (BR);
Marcelo N. Schlickmann, Joinville (BR); Orlando Starke, Joinville (BR);
Rodrigo S. Teixeira, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 378 days.

(21) Appl. No.: 13/428,021

(22) Filed: Mar. 23, 2012

(65) Prior Publication Data
US 2013/0249328 A1  Sep. 26, 2013

(51) Int. Cl.
*H02K 15/12* (2006.01)
*H02K 1/14* (2006.01)
*H02K 1/18* (2006.01)
*H02K 3/32* (2006.01)
*H02K 3/52* (2006.01)

(52) U.S. Cl.
CPC .............. *H02K 1/148* (2013.01); *H02K 1/187* (2013.01); *H02K 3/325* (2013.01); *H02K 3/522* (2013.01); *H02K 2213/03* (2013.01)

(58) Field of Classification Search
CPC ... H02K 15/12; H02K 1/148; H02K 2203/12; H02K 1/187; H02K 1/185
USPC ............ 310/194, 216.098, 216.009, 43, 310/216.057, 216.064, 216.091
See application file for complete search history.

(56) References Cited

U.S. PATENT DOCUMENTS

| | | | |
|---|---|---|---|
| 571,462 A | 11/1896 | Thomson et al. |
| 596,152 A | 12/1897 | Geisenhoner |
| 887,521 A | 5/1908 | Reist |
| 907,891 A | 12/1908 | Sulzberger |
| 1,031,316 A | 7/1912 | Apple |
| 1,957,380 A | 5/1934 | Barlow |
| 2,247,890 A | 7/1941 | Reardon |
| 2,433,660 A | 12/1947 | Granfield |
| 2,607,816 A | 8/1952 | Ryder et al. |
| 2,736,829 A | 2/1956 | Sills |
| 3,714,477 A | 1/1973 | Gott |
| 3,898,491 A | 8/1975 | Long et al. |
| 4,264,836 A | 4/1981 | Dukshtau et al. |
| 4,712,035 A | 12/1987 | Forbes et al. |
| 4,835,839 A | 6/1989 | Forbes et al. |

(Continued)

FOREIGN PATENT DOCUMENTS

| DE | 1538885 A | 4/1970 |
|---|---|---|
| DE | 3638228 A1 | 5/1987 |

(Continued)

OTHER PUBLICATIONS

German Search Report, German Patent Application No. 10 2013 100 912.3, Jul. 26, 2013, 3 pages.

*Primary Examiner* — Terrance Kenerly

(57) ABSTRACT

A stator for an electric motor includes a stator core including a yoke and a plurality of arms extending radially from the yoke. The stator includes an end piece secured to a radial end of each arm of the stator core. The stator core has a length defined along a longitudinal axis of the stator, and each end piece has a length defined along the longitudinal axis of the stator. The length of each end piece is greater than the length of the stator core.

15 Claims, 12 Drawing Sheets

(56) References Cited

U.S. PATENT DOCUMENTS

| | | | |
|---|---|---|---|
| 4,942,324 A | 7/1990 | Ooyama et al. | |
| 5,604,389 A * | 2/1997 | Nitta et al. | 310/67 R |
| 5,942,829 A | 8/1999 | Huynh | |
| 5,949,172 A * | 9/1999 | Katagiri | 310/216.091 |
| 6,107,718 A | 8/2000 | Schustek et al. | |
| 6,140,728 A | 10/2000 | Tomita et al. | |
| 6,166,474 A * | 12/2000 | Kohara et al. | 310/216.093 |
| 6,167,610 B1 * | 1/2001 | Nakahara et al. | 29/596 |
| 6,448,685 B1 | 9/2002 | Mayer et al. | |
| 6,459,186 B1 | 10/2002 | Umeda et al. | |
| 6,552,453 B2 | 4/2003 | Ohiwa et al. | |
| 6,611,076 B2 | 8/2003 | Lindbery et al. | |
| 6,674,203 B2 | 1/2004 | Kurahashi et al. | |
| 6,806,615 B2 | 10/2004 | Enomoto et al. | |
| 6,879,079 B2 | 4/2005 | Vollmer | |
| 6,960,857 B2 | 11/2005 | Oohashi et al. | |
| 7,247,967 B2 | 7/2007 | Ionel et al. | |
| 7,466,054 B2 | 12/2008 | Watson et al. | |
| 7,541,711 B2 | 6/2009 | Adaniya et al. | |
| 7,626,301 B2 | 12/2009 | Enomoto et al. | |
| 7,639,004 B2 | 12/2009 | Islam et al. | |
| 7,732,969 B2 | 6/2010 | Ishizeki et al. | |
| 7,737,598 B2 | 6/2010 | Ionel et al. | |
| 7,872,393 B2 | 1/2011 | Okazaki et al. | |
| 7,884,520 B2 | 2/2011 | Ishida et al. | |
| 7,960,889 B2 | 6/2011 | Yamamoto | |
| 7,990,015 B2 | 8/2011 | Mongeau et al. | |
| 2002/0149282 A1 * | 10/2002 | Heidrich | 310/218 |
| 2003/0184182 A1 * | 10/2003 | Smith, Jr. | 310/217 |
| 2006/0061228 A1 | 3/2006 | Lee et al. | |
| 2006/0138894 A1 | 6/2006 | Harada et al. | |
| 2006/0197399 A1 | 9/2006 | Kataoka et al. | |
| 2007/0182270 A1 | 8/2007 | Chuang | |
| 2008/0036329 A1 * | 2/2008 | Chen et al. | 310/216 |
| 2009/0026875 A1 * | 1/2009 | Mongeau et al. | 310/218 |
| 2009/0195112 A1 | 8/2009 | Chai et al. | |
| 2010/0219714 A1 | 9/2010 | Abe et al. | |
| 2010/0237752 A1 | 9/2010 | Yoshikawa et al. | |
| 2010/0259112 A1 | 10/2010 | Chung et al. | |
| 2011/0101818 A1 * | 5/2011 | Lokhandwalla et al. | 310/216.098 |
| 2011/0187222 A1 | 8/2011 | Li et al. | |
| 2011/0309711 A1 | 12/2011 | Brown | |

FOREIGN PATENT DOCUMENTS

| | | |
|---|---|---|
| DE | 10147345 A1 | 5/2002 |
| EP | 2590302 A1 | 5/2011 |
| EP | 2503154 A2 | 9/2012 |
| JP | 09163643 A | 6/1997 |
| JP | 2008245362 A | 10/2008 |
| WO | 2012002053 A1 | 1/2012 |

* cited by examiner

STATOR FOR AN ELECTRIC MOTOR INCLUDING SEPARATELY FORMED END PIECES AND ASSOCIATED METHOD

CROSS-REFERENCE TO RELATED U.S. PATENT APPLICATIONS

Cross-reference is made to co-pending U.S. Utility patent application Ser. No. 13/427,953 entitled "STATOR FOR AN ELECTRIC MOTOR OF A WASHING MACHINE AND METHOD OF MANUFACTURING THE SAME," which was filed on Mar. 23, 2012, which is assigned to the same assignee as the present application and which is hereby incorporated by reference.

TECHNICAL FIELD

The present disclosure relates generally to an electric motor for a washing machine, and, more particularly, to a stator for an electric motor of a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys or gears. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a number of stator field coils. The rotor may include one or more magnets that interact with the stator field coils. During operation, the stator field coils may be sequentially energized with electricity to cause the rotor to rotate.

SUMMARY

According to one aspect, a stator for an electric motor is disclosed. The stator includes a stator core having a yoke and a plurality of arms extending radially from the yoke. The stator also includes an end piece secured to a radial end of each arm of the stator core, and each end piece includes a plurality of stacked laminations. The stator core has a length defined along a longitudinal axis of the stator, and each end piece has a length defined along the longitudinal axis of the stator, the length of each end piece being greater than the length of the stator core.

In some embodiments, a ratio may be defined between the length of the stator core and the length of the end piece, and the ratio may have a magnitude between 0.4 and 0.9. In some embodiments, the ratio may have a magnitude of approximately 0.675. Additionally, in some embodiments, the length of the stator core may be defined between a first substantially planar surface and a second substantially planar surface, and the length of each end piece may be defined between a first end and a second end. A first distance may be defined between the first substantially planar surface of the stator core and the first end of the end piece, and a second distance may be defined between the second substantially planar surface of the stator core and the second end of the end piece. The second distance may be approximately equal to the first distance.

In some embodiments, each end piece may have a channel defined in a first side wall, and each arm of the stator core may include an end wall extending between the first substantially planar surface and the second substantially planar surface, and a protrusion extending from the end wall. The protrusion may be received in the channel defined in the corresponding end piece.

In some embodiments, the channel of each end piece may extend from the first end to the second end of each end piece. In some embodiments, each end piece may further include a body having the channel defined therein, and a cap secured to the body. The cap of each end piece may have a first end that covers an open end of the channel and contacts the protrusion of the stator core. Additionally, in some embodiments, the channel of each end piece and the protrusion of each arm may have corresponding dovetail shapes.

In some embodiments, each arm of the stator core may include an end wall extending between the first substantially planar surface and the second substantially planar surface. Each end wall may have a channel defined therein. Each end piece may have a protrusion extending from the end wall, and the protrusion may be received in the channel defined in the corresponding arm of the stator core.

Additionally, in some embodiments, the stator may further include a polymeric shell extending over the stator core and the end pieces, and each end piece may have a second side wall positioned opposite the first side wall extending from an opening defined in the polymeric shell. In some embodiments, the arms of the stator core may extend radially outward from the yoke away from the longitudinal axis. In some embodiments, the arms of the stator core may extend radially inward from the yoke toward the longitudinal axis.

In some embodiments, the stator core may have a plurality of laminations. Each lamination may include an annular plate having a plurality of protrusions extending therefrom, and the annular plates of the laminations may cooperate to define the yoke. The plurality of protrusions of each lamination may cooperate with the plurality of protrusions of the other laminations to define the arms of the stator core. In some embodiments, a first distance may be defined between the stator core and a first end of each end piece, and a second distance may be defined between the stator core and a second end of each end piece. The second distance being less than the first distance.

According to another aspect, a stator for an electric motor includes a stator core having a yoke, and a plurality of arms extending radially from the yoke. Each arm has a length defined between a first substantially planar surface and a second substantially planar surface. An end piece is secured to a radial end of each arm of the stator core. Each end is formed from a soft magnetic composite material. Each end piece has a first end positioned above the first substantially planar surface of each arm and a second end positioned below the second substantially planar surface of each arm. Each end piece has a length defined between the first end and the second end that is greater than the length of the each arm.

In some embodiments, a ratio may be defined between the length of the arm and the length of the end piece. The ratio may have a magnitude between 0.4 and 0.9. In some embodiments, the polymeric shell may be injection-molded to the stator core and the end pieces.

Additionally, in some embodiments, a first distance may be defined between the first substantially planar surface of the stator core and the first end of the end piece, and a second distance may be defined between the second substantially planar surface of the stator core and the second end of the end piece. The second distance may be less than the first distance.

In some embodiments, each end piece may have a channel defined in a first side wall, and each arm of the stator core may includes an end wall extending between the first substantially planar surface and the second substantially planar surface and a protrusion extending from the end wall. The protrusion may be received in the channel defined in the corresponding end piece. In some embodiments, the arms of the stator core may extend radially inward from the yoke toward the longitudinal axis.

BRIEF DESCRIPTION OF THE DRAWINGS

The detailed description particularly refers to the following figures, in which.

DETAILED DESCRIPTION OF THE DRAWINGS

Figure 1:
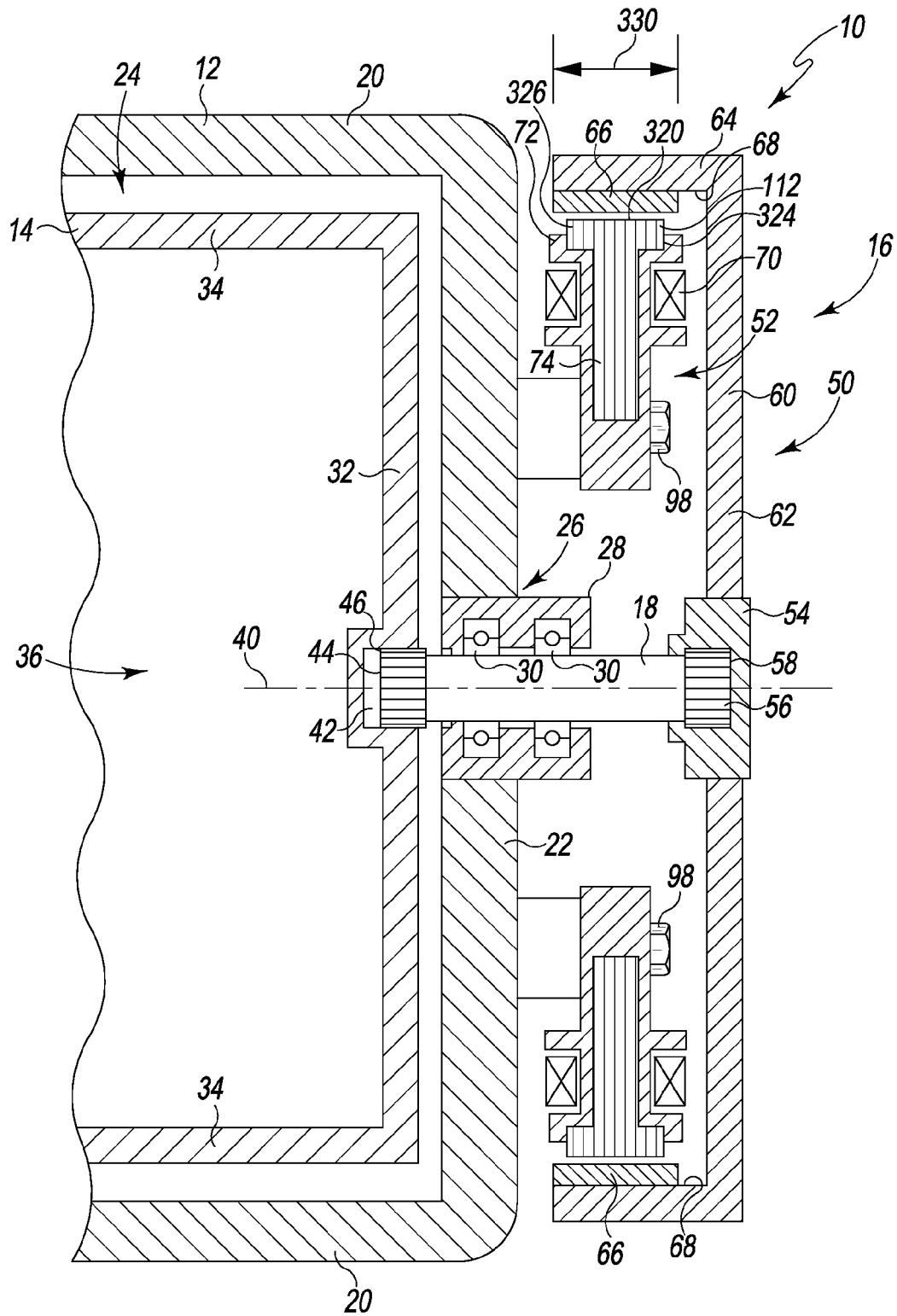
FIG. 1 is a cross-sectional side elevation view of an electric motor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a washing machine 10 is shown. The washing machine 10 includes a tub 12, a drum 14 positioned in the tub 12, and an electric motor 16 operable to rotate the drum 14 via a drive shaft 18. The tub 12 includes a number of side walls 20 extending from a rear wall 22 to define a washing chamber 24. The rear wall 22 has an opening 26 defined therein, and a mounting hub 28 is positioned in the opening 26. The mounting hub 28 is secured to the tub 12 and includes a pair of roller bearings 30 that receive the drive shaft 18.

The drum 14 of the washing machine 10 is positioned in the washing chamber 24 of the tub 12. The drum 14 includes a rear wall 32 and a number of side walls 34 that extend from the rear wall 32 to define a cavity 36. The cavity 36 is sized to receive clothes and other laundry to be washed in the washing machine 10. The tub 12 and the drum 14 may be formed from metallic materials, such as, for example, steel, or from polymeric materials, such as, for example, a rigid plastic resin.

While the tub 12 is stationary, the drum 14 is configured to rotate relative to the tub 12 about a rotational axis 40. As shown in FIG. 1, the drive shaft 18 has an end 42 secured to the drum 14. During operation, the drum 14 is rotated about the axis 40 when the drive shaft 18 is driven by the motor 16. In the illustrative embodiment, the drive shaft 18 includes a plurality of splines 44 that engage with a corresponding plurality of slots 46 defined in the drum 14 to torsionally secure the drive shaft 18 to the drum 14. It should be appreciated that in other embodiments the drive shaft may be connected indirectly to the drum 14 via a transmission system. In some embodiments, the transmission system may include a number of pulleys and belts or a gear assembly that is configured to translate the rotary motion of the drive shaft into rotational movement for the drum.

In the illustrative embodiment, the washing machine 10 is a front-loaded machine in which the drum 14 is accessed through an opening defined in the front (not shown) of the tub 12. It should be appreciated that in other embodiments the washing machine may have other configurations. For example, the washing machine may be a top-loaded machine in which the drum 14 is accessed through an opening defined in the top (not shown) of the tub 12.

As shown in FIG. 1, the motor 16 of the washing machine 10 includes a rotor 50 secured to the drive shaft 18 and a stator 52 secured to the rear wall 22 of the tub 12. As described in greater detail below, the rotor 50 cooperates with the stator 52 to rotate the drive shaft 18 (and hence drum 14) about the axis 40 under the control of an electric controller (not shown) of the washing machine 10. The rotor 50 includes a hub 54 secured to the drive shaft 18 via a plurality of splines 56. The splines 56 of the drive shaft 18 are received in corresponding slots 58 defined in the hub 54 to torsionally secure the rotor 50 to the drive shaft 18.

The rotor 50 of the motor 16 also includes a frame 60 that is secured to the hub 54. In the illustrative embodiment, the hub 54 and the frame 60 are formed from a metallic material as a single monolithic component. It should be appreciated that in other embodiments the hub 54 and the frame 60 may be formed separately for later assembly. It should also be appreciated that in other embodiments the hub 54 and/or the frame 60 may be formed from a polymeric material. As shown in FIG. 1, the frame 60 of the rotor 50 includes a side wall 62 extending from the hub 54. An outer rim 64 extends from the side wall 62 to define a cup-shape.

The rotor 50 includes a plurality of magnets 66 secured to an inner surface 68 of the outer rim 64. In the illustrative embodiment, each magnet 66 is a permanent magnet that generates a constant magnetic field in the rotor 50. The magnets 66 may be formed from ferrite materials, alnico, neodymium, or other magnetic material and may be produced by any known process, including, for example, sintering, molding, or extrusion. During operation, the magnets 66 interact with the field coils 70 of the stator 52 to cause the rotor 50 to rotate about the axis 40, as described in greater detail below.

The stator 52 of the motor 16 includes an outer shell 72 and a stator core 74 positioned in the outer shell 72. The outer shell 72 and the stator core 74 define a longitudinal axis 76 extending through the stator 52. As shown in FIG. 1, the longitudinal axis 76 of the stator 52 is coaxially aligned with the axis 40. The outer shell 72 of the stator 52 is formed from a polymeric material, such as, for example, a plastic resin, which is molded over the stator core 74 via an injection molding process, as described in greater detail below. It should also be appreciated that in other embodiments the plastic shell may be a separately formed component that is later assembled with the stator core 74.

Figure 2:
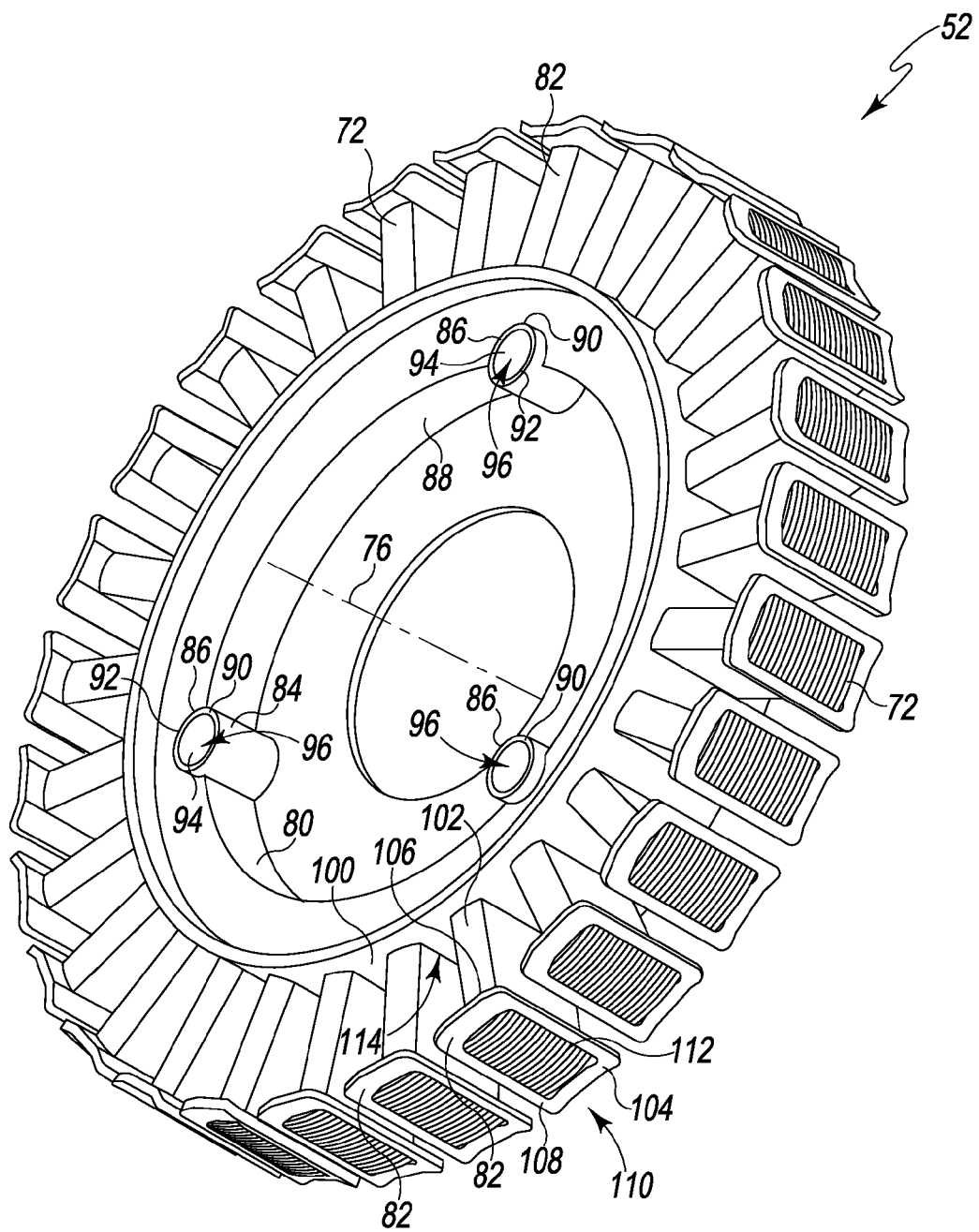
FIG. 2 is a perspective view of a stator of the electric motor of FIG. 1.

Referring now FIGS. 1 and 2, the outer shell 72 of the stator 52 includes a central hub 80 and a plurality of casings 82 that extend radially outward from the hub 80. The central hub 80 includes a mounting frame 84 configured to secure the stator 52 to the tub 12. In the illustrative embodiment, the mounting frame 84 includes a number of brackets 86 positioned around the cylindrical inner surface 88 of the hub 80. Each bracket 86 includes an outer face 90 that has a circular opening 92 defined therein. An inner surface 94 extends inwardly from the opening 92 to define a bore 96 through the central hub 80. The bore 96 is sized to receive a fastener 98, such as, for example, a bolt or other threaded rod, which extends through the bore 96 to engage the rear wall 22 of the tub 12 and secure the stator 52 to the tub 12.

The central hub 80 of the shell 72 has a cylindrical outer surface 100 positioned opposite the cylindrical inner surface 88. Each casing 82 of the shell 72 includes a body 102 that extends outwardly from the outer surface 100 away from the longitudinal axis 76 of the stator 52. Each casing 82 also has a flange 104 that extends outwardly from the radial end 106 of the body 102. As shown in FIGS. 1 and 2, each flange 104 has an opening 108 defined therein. As described in greater detail below, the stator core 74 includes a tooth 110 that is positioned in each casing 82 of the shell 72, and the stator 52 includes a tooth head or end piece 112 that is secured to each tooth 110. Each end piece 112 extends from the opening 108 of each casing 82.

The stator 52 has a number of coil slots 114 defined between the plurality of casings 82 of the shell 72. Each coil slot 114 is sized to receive a field coil 70 of the stator 52. The field coils are wrapped around the casings 82 (and hence teeth 110) of the stator 52. In operation, the field coils 70 are energized selectively to generate magnetic fields around the teeth 110 of the stator core 74. As the field coils are energized, the end pieces 112 of teeth 110 function as electromagnets that interact with the permanent magnets 66 of the rotor 50 to cause the rotor 50 to spin about the rotational axis 40.

In the illustrative embodiment, the stator 52 is an inner stator, which is positioned in the center of the electric motor 16 and surrounded by the rotor 50. As a result, the teeth 110 of the stator core 74 extend radially outward from the longitudinal axis 76 of the stator 52. It should be appreciated that in other embodiments the stator 52 may be an outer stator that surrounds an inner rotor located in the center of the electric motor. In such embodiments, the teeth of the stator core extend radially inward toward the longitudinal axis of the stator.

Figure 3:
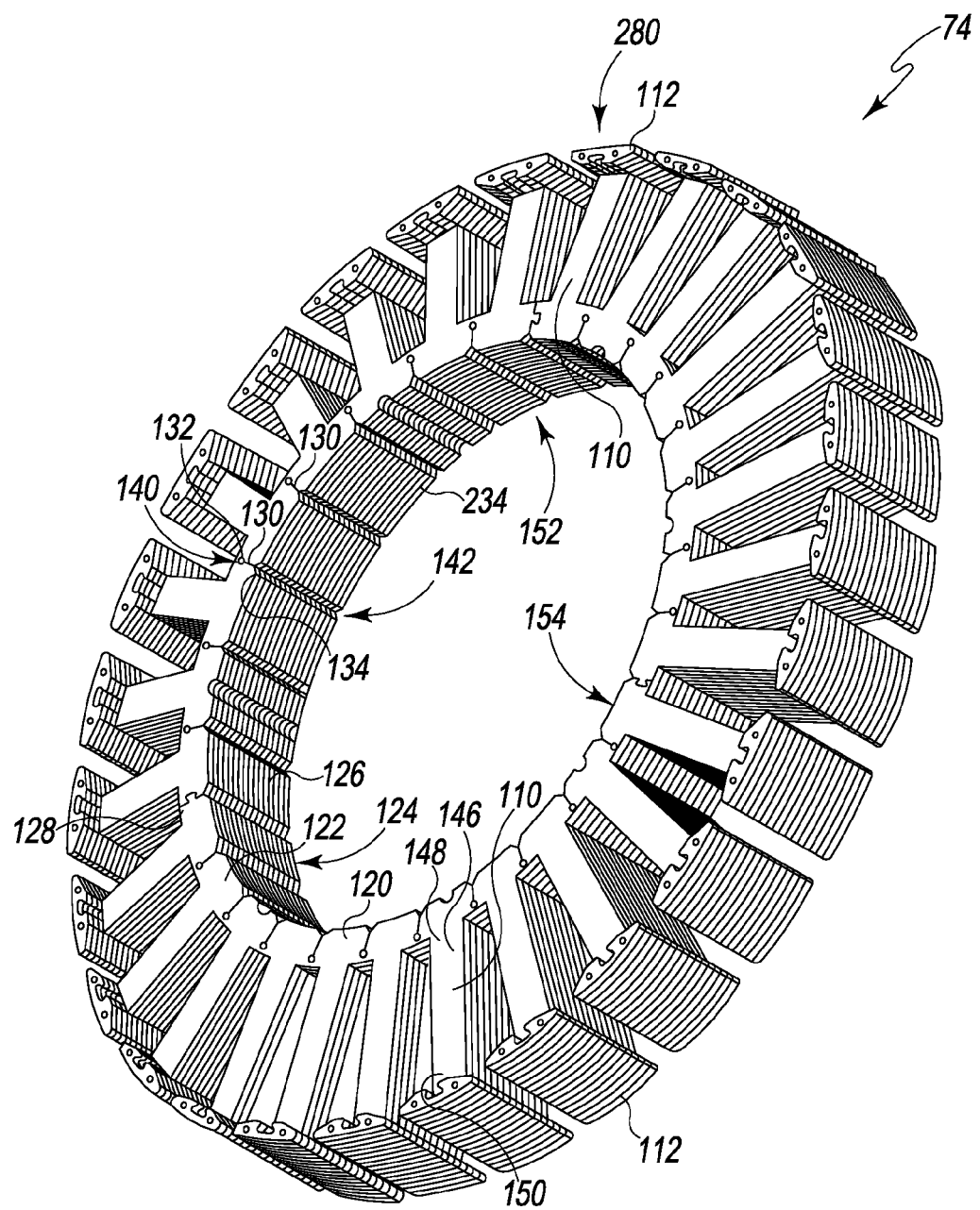
FIG. 3 is a perspective view of a stator core and a number of end pieces of the stator of FIG. 2.

Referring now to FIG. 3, the stator core 74 of the stator 52 includes a yoke 120 and the plurality of teeth 110 extend radially outward from the yoke 120. The yoke 120 includes a pair of outer annular surfaces 122, 124 and a pair of side walls 126, 128 that extend between the annular surfaces 122, 124. The yoke 120 also has a plurality of grooves 130 defined therein. Each groove 130 is positioned between a pair of teeth 110 and extends through the surface 122, 124 of the yoke 120.

Each groove 130 of the stator core 74 extends inwardly from an end 132 positioned between the side walls 126, 128 of the yoke 120 to an end 134 defined in the side wall 126. The yoke 120 includes a number of passageways 140, 142 that are defined at the ends 132, 134, respectively, of each groove 130. As described in greater detail below, a number of support beams 144 of the outer shell 72 are formed in the passageways 140, 142 when the shell 72 is molded over the stator core 74.

As described above, the stator core 74 includes a plurality of teeth 110 that extend from the yoke 120. Each tooth 110 includes an arm 146 extending from an end 148 attached to the yoke 120 to an end 150. The tooth head or end piece 112 of each tooth 110 is secured to the end 150. In the illustrative embodiment, the end pieces 112 are formed separately from the stator core 74 and later attached to the ends 150 of the arms 146 via a locking mechanism 280, as described in greater detail below.

Figure 4:
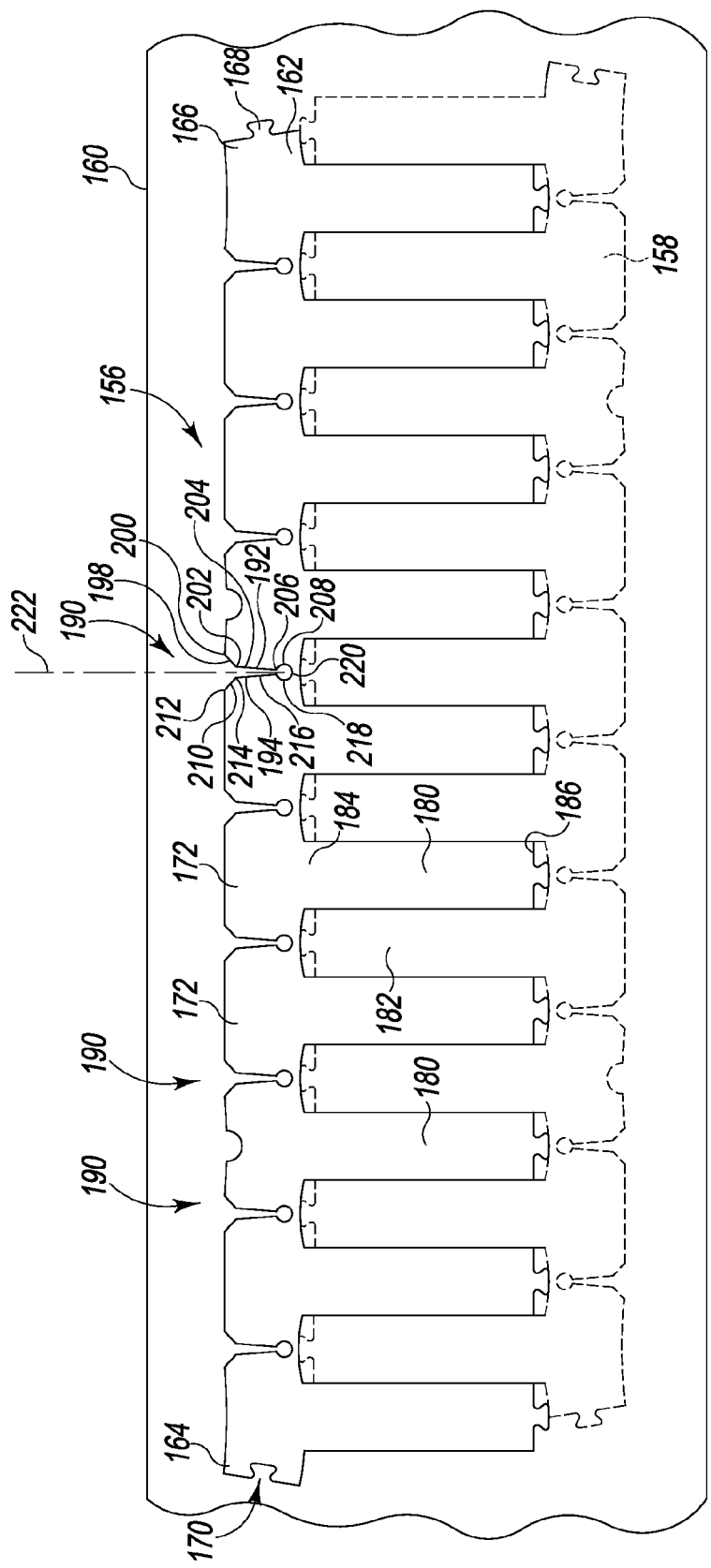
FIG. 4 is a top plan view of a lamination strip of the stator core of FIG. 3.
Figure 5:
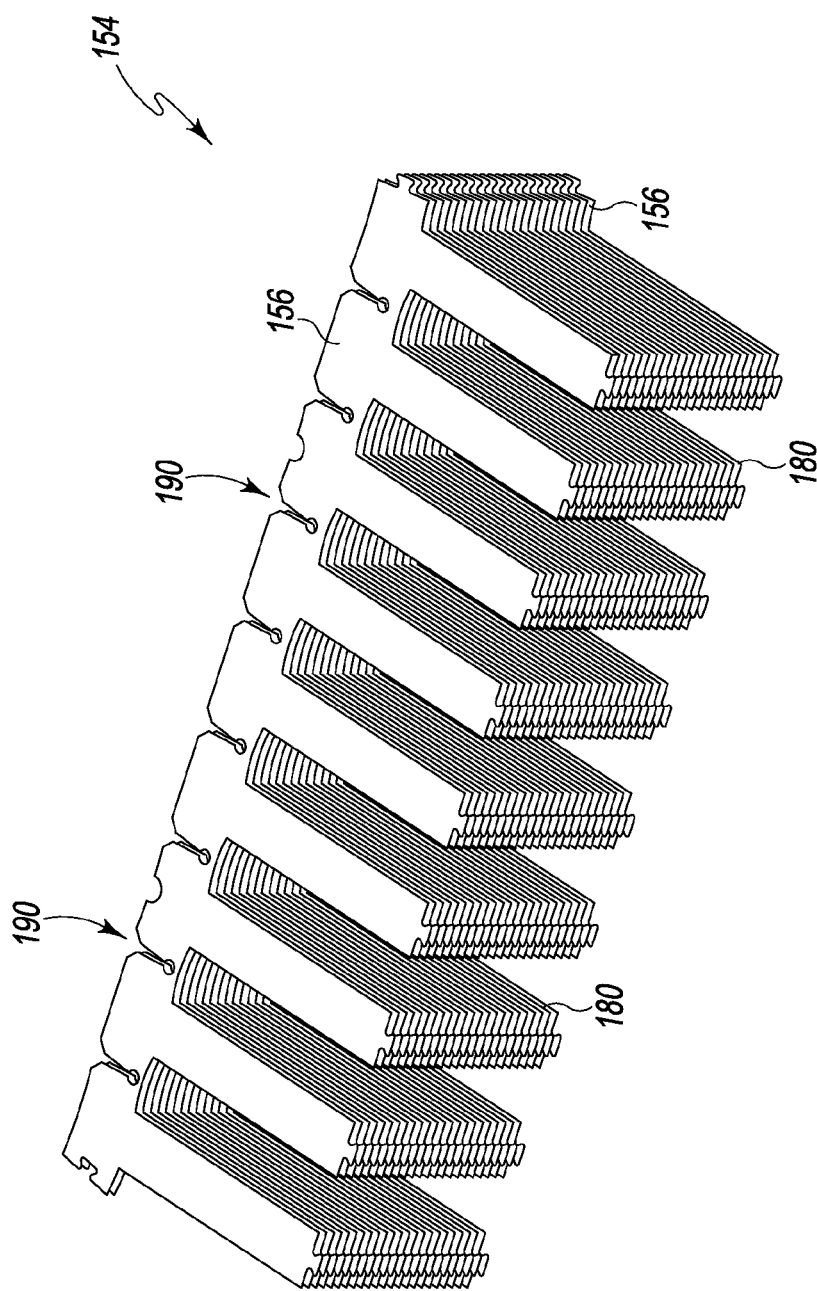
FIG. 5 is a perspective view of a core segment of the stator core of the stator core of FIG. 3.

As shown in FIG. 3, the stator core 74 of the stator 52 is formed from a plurality of stacked laminations 152. Each lamination 152 is formed from a metallic material, such as, for example, steel. As shown in FIGS. 4 and 5 and described in greater detail below, the stator core 74 may be manufactured by producing a number of generally flat metal strips 156. The strips 156 may be stacked into a number of straight core segments 154. Each straight core segment 154 may be bent into a core arc segment 155, which corresponds to the shape of stator core 74. The core arc segments 155 may be assembled together to form the stator core 74.

The lamination strip 156 shown in FIG. 4 may be produced via a progressive stamping process. To do so, a metal strip or sheet 160 may be advanced through one or more stations of a progressive stamping die. As the sheet 160 is moved through the stations, the sheet 160 is cut into a pair of generally flat metal strips 156, 158. As shown in FIG. 4, the strip 158 is the mirror image of the strip 156. It should be appreciated that the sheet 160 may be the same length as the strips 156, 158 or may be part of a larger roll of sheet metal that is advanced through the stamping die and cut into one or more pieces.

The strip 156 includes a substantially straight plate 162 extending from a longitudinal end 164 to another longitudinal end 166. The plate 162 includes a tab 168 that extends outwardly from the longitudinal end 166. A notch 170 is defined in the opposite longitudinal end 164 of the plate 162 and is sized to receive a corresponding tab 168 of the strip 158 such that the strips 156, 158 may be joined together, as described in greater detail below. It should be appreciated that in other embodiments the ends 164, 166 may include additional tabs and/or slots. It should also be appreciated that in other embodiments the tabs and slots may be omitted.

As shown in FIG. 4, the plate 162 includes a plurality of interconnected segments 172. Each segment 172 has a side wall 174, and the side wall 174 has a surface 176 that is concave. The radius of the surface 176 corresponds to the internal diameter 154 defined by the side wall 126 of the yoke 120. Each segment 172 of the plate 162 also has a side wall 178 positioned opposite the side wall 174 and a protrusion 180 that extends outwardly from the side wall 178. As described in greater detail below, each protrusion 180 corresponds to a tooth 110 of the stator core 74. Each protrusion 180 has a body 182 that includes a base 184 attached to the side wall 178 of the plate 162 and an end 186 spaced apart from the base 184.

The plate 162 has a plurality of notches 190 positioned between the segments 172. Each notch 190 is defined by a pair of inner walls 192, 194 that extend inwardly from the side walls 174 of the segments 172. The inner wall 192 includes a chamfer wall section 198 that extends from an outer edge 200 connected to the side wall 174 of one segment 172 to an inner edge 202. The inner edge 202 is connected to a substantially planar wall section 204. The wall section 204 of the inner wall 192 extends inwardly from the edge 202 to an edge 206 connected to a concave wall section 208.

The other inner wall 194 of the plate 162 includes a chamfer wall section 210 that extends from an outer edge 212 connected to the side wall 174 of another segment 172 to an inner edge 214. The inner edge 214 of the wall section 210 is connected to a substantially planar wall section 216. The wall section 216 of the inner wall 194 extends inwardly from the edge 214 to an edge 218 connected to a concave wall section 220 of the inner wall 194. The concave wall section 220 of the inner wall 194 is joined with the concave wall section 208 of the inner wall 192 along the central axis 222 of the notch 190.

Figure 6:
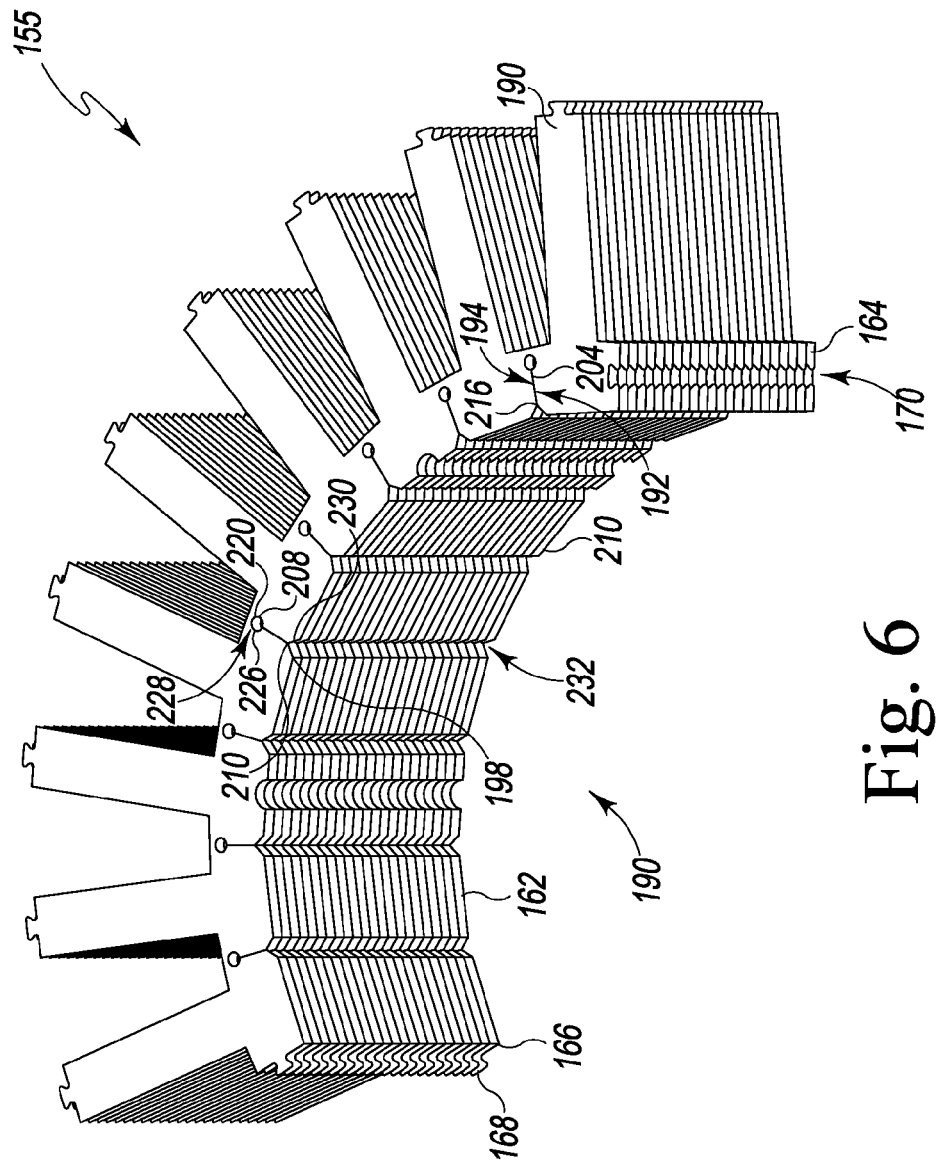
FIG. 6 is a top plan view showing the core segment of FIG. 5 partially bent into the shape of the stator core of FIG. 3.

After the lamination strip 156 is produced, the lamination strip 156 may be stacked with other lamination strips 156 to produce a core segment 154. As shown in FIG. 5, a number of lamination strips 156 may be arranged such that the notches 190 and the protrusions 180 of each plate 162 are aligned. The core segment 154 may then be bent into a core arc segment 155. As shown in FIG. 6, the core arc segment 155 may be curled or rolled about an imaginary axis such that the substantially planar wall section 204 of each inner wall 192 is brought into contact with the substantially planar wall section 216 of the inner wall 194. At one end 226 of each notch 190, the concave wall sections 208, 220 of the inner walls 192, 194 cooperate to define a slot 228 in the plate 162. At the other end 230 of each notch 190, the chamfer wall sections 198, 210 cooperate to define a slot 232 in the plate 162.

The plates 162 of the core arc segment 155 may be joined at each end 164, 166 to the plates 162 of other core arc segments 155 to produce the stator core 74 of the stator 52. To do so, the tabs 168 of the plates 162 of one core arc segment 155 may be positioned in the notches 170 of the plates 162 of another core arc segment 155. The ends 164, 166 are further joined by welding core arc segments 155 along the seam 236 defined between the ends 164, 166 of the plates 162, as shown in FIG. 3.

When assembled, the bent plates 162 of the core segments 154 form the yoke 120 of the stator core 74, while the protrusions 180 of the core segments 154 form the teeth 110. In the illustrative embodiment, each lamination 152 of the yoke 120 includes a number of plates 162 that cooperate to define an annular plate 234. The notches 190 of the core segments 154 form the grooves 130 extending through the yoke 120. The slots 228 of the core segments 154 cooperate to define the passageway 140 through the yoke 120, and the slots 232 cooperate to define the passageway 142 through the yoke 120 when the core segments 154 are assembled.

Figure 7:
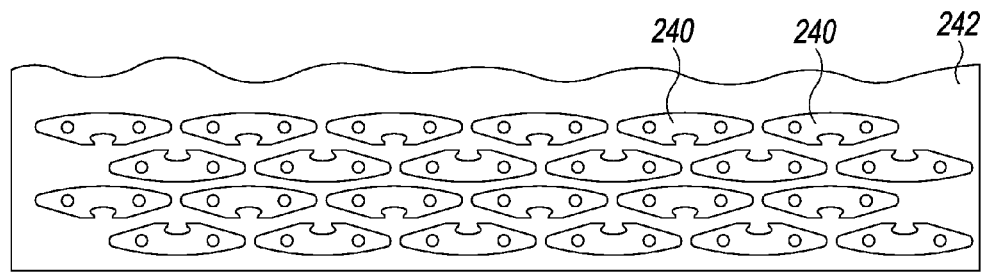
FIG. 7 is a top plan view of a metal sheet including a number of end piece laminations.
Figure 8:
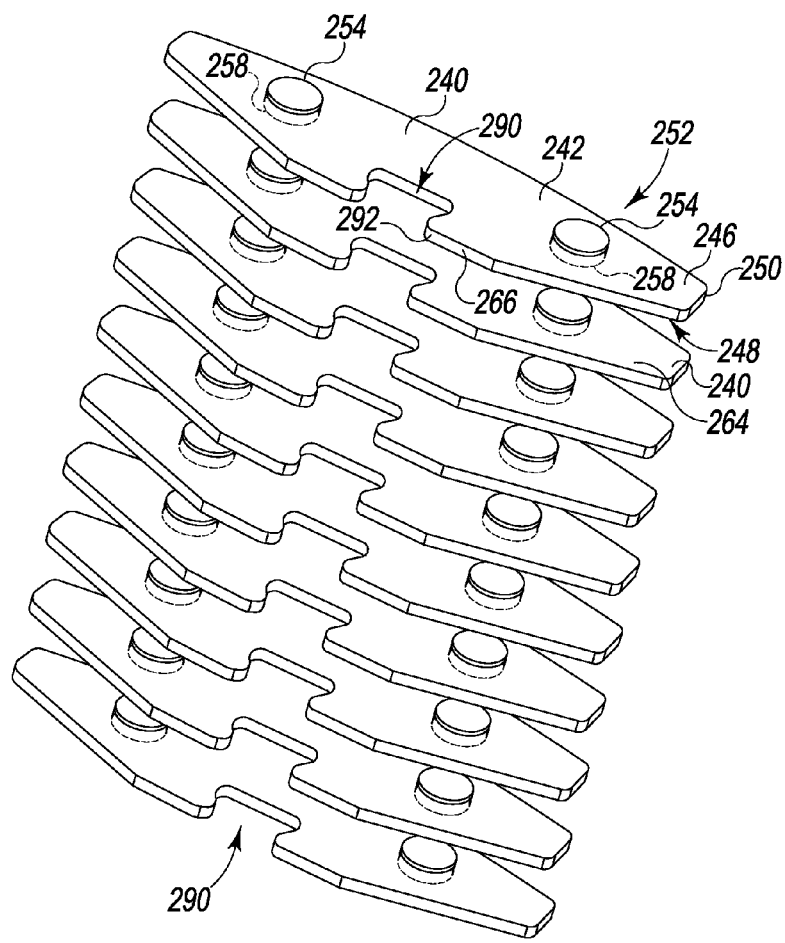
FIG. 8 is an exploded view of a number of the end piece laminations of FIG. 7.

Referring now to FIGS. 7 and 8, each end piece 112 of the stator 52 is formed from a plurality of stacked laminations 240. Each lamination 240 of the end piece 112 is formed from a metallic material, such as, for example, steel. As shown in FIG. 7, each lamination 240 may be produced via a progressive stamping process. To do so, a metal strip or sheet 242 may be advanced through one or more stations of a progressive stamping die. As the sheet 242 is moved through the stations, the sheet 242 is cut into the laminations 240.

Each lamination 240 of each end piece 112 has a body 244 that includes an upper surface 246 and a lower surface 248. A side wall 250 extends between the surfaces 246, 248 to define the outer perimeter of the body 244. In the illustrative embodiment, the body 244 has an oblong shape. In other embodiments, the body 244 may have a substantially rectangular, oval, or other suitable geometric shape.

Each lamination 240 also includes a locking mechanism 252 that is configured to secure one lamination 240 to another lamination 240. In the illustrative embodiment, the locking mechanism 252 includes a pair of tabs 254 that extends from the upper surface 246 of the body 244. The locking mechanism 252 also includes a pair of apertures 258 defined in the lower surface 248 of the body 244. Each aperture 258 is sized to receive one of the tabs 254, and the tabs 254 are configured to engage the inner wall 262 of the aperture 258 to secure one lamination 240 to another.

In the illustrative embodiment, each tab 254 has a circular cross-sectional shape and each aperture 258 has a matching cross-sectional geometric shape. It should be appreciated that in other embodiments the tabs and apertures may have a square, oval, rectangular, or other suitable cross-sectional geometric shape. Additionally, in the illustrative embodiment, the tabs 254 and the apertures 258 of each lamination 240 may be formed during the progressive stamping process described above. As the sheet 242 is moved through the stations, the sheet 242 may be stamped to create the tabs 254 and the apertures 258 in the one operation. It should be appreciated that in other embodiments the locking mechanism may include additional or fewer tabs 254 and apertures 258 to secure the laminations 240 together. It should also be appreciated that in other embodiments the locking mechanism may include one or more mechanical fasteners or adhesives to secure the laminations 240 together.

To assemble one of the end pieces 112, a number of laminations 240 are stamped from the sheet 242. As shown in FIG. 7, the laminations 240 are arranged so that the tabs 254 and the apertures 258 of each lamination 240 are aligned. The laminations 240 may then be advanced in contact such the tabs 254 of one lamination 240 are advanced into the apertures 258 of another lamination 240. For example, as shown in FIG. 7, a lower lamination 264 and an upper lamination 266 of the laminations 240 may be moved into contact such that the tabs 254 of the lower lamination 264 are advanced into the apertures 258 of the upper lamination 266. As described above, each tab 254 of the lower lamination 264 engages the inner wall 262 of each aperture 258 of the upper lamination 266 to secure the lower lamination 264 to the upper lamination 266. When assembled, the upper surface 246 of the lower lamination 264 is engaged with the lower surface 248 of an upper lamination 266.

Figure 9:
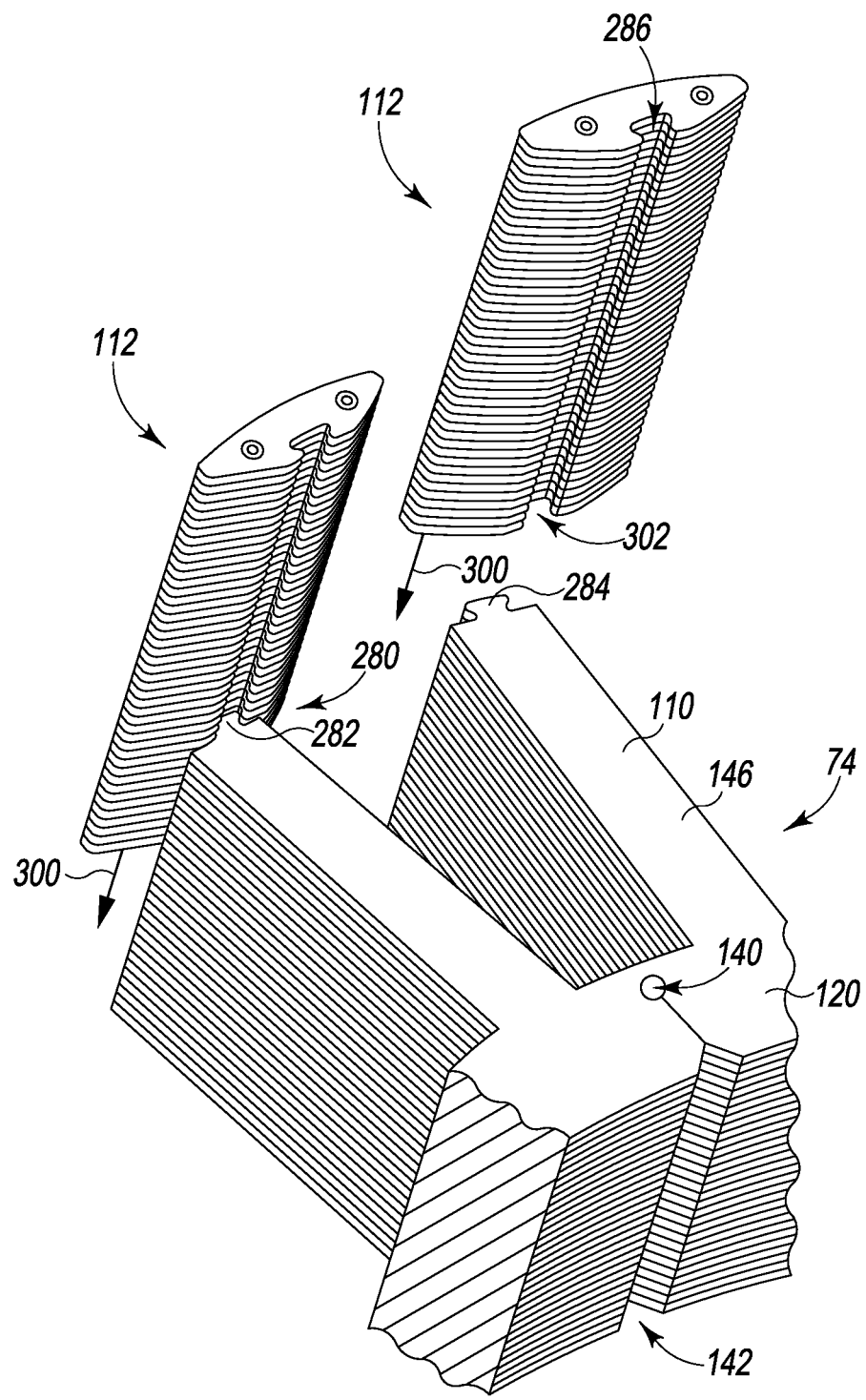
FIG. 9 is an exploded perspective view of a pair of end pieces and the stator core of FIG. 3.

As described above, each end piece 112 is secured to each tooth 110 of the stator core 74 via a locking mechanism 280. Each locking mechanism 280 is a dovetail joint 282 that secures the end piece 112 to the tooth 110. The joint 282 includes a pin 284 that extends outwardly from the end 150 of each tooth 110. As shown in FIG. 9, the pin 284 has a trapezoidal shape. Each locking mechanism 280 also includes a corresponding trapezoidal-shaped channel 286 defined in each end piece 112. In the illustrative embodiment, the end piece 112 is secured to stator core 74 via a press fit.

In the illustrative embodiment, each protrusion 180 of each lamination 152 of the stator core 74 includes a flange 288 that extends outwardly from the end 186, as shown in FIG. 4. The flanges 288 of the stacked laminations 152 cooperate to define the pin 284 of the dovetail joint 282. Similarly, each lamination 240 of the end piece 112 includes a slot 290 that is defined in one side 292 thereof. The slots 290 of the stacked laminations 240 cooperate to define the channel 286 of the dovetail joint 282. It should be appreciated that in other embodiments the configuration of the dovetail joint may be reversed with the channels defined in the teeth of the stator core and the pins may extend from the end pieces.

To attach the end pieces 112 to the stator core 74, each end piece 112 may be positioned above the stator core 74, as shown in FIG. 9. After aligning the channel 286 of the end piece 112 with the pin 284 of the tooth 110, the end piece 112 may be advanced downward in the direction indicated by arrow 300. As the end piece 112 is moved downward, the lower opening 302 of the channel 286 is positioned over the pin 284 of the tooth 110. The end piece 112 may continue to be advanced downward to fully position the pin 284 in the channel 286 and thereby secure the end piece 112 to the tooth 110.

Figure 10:
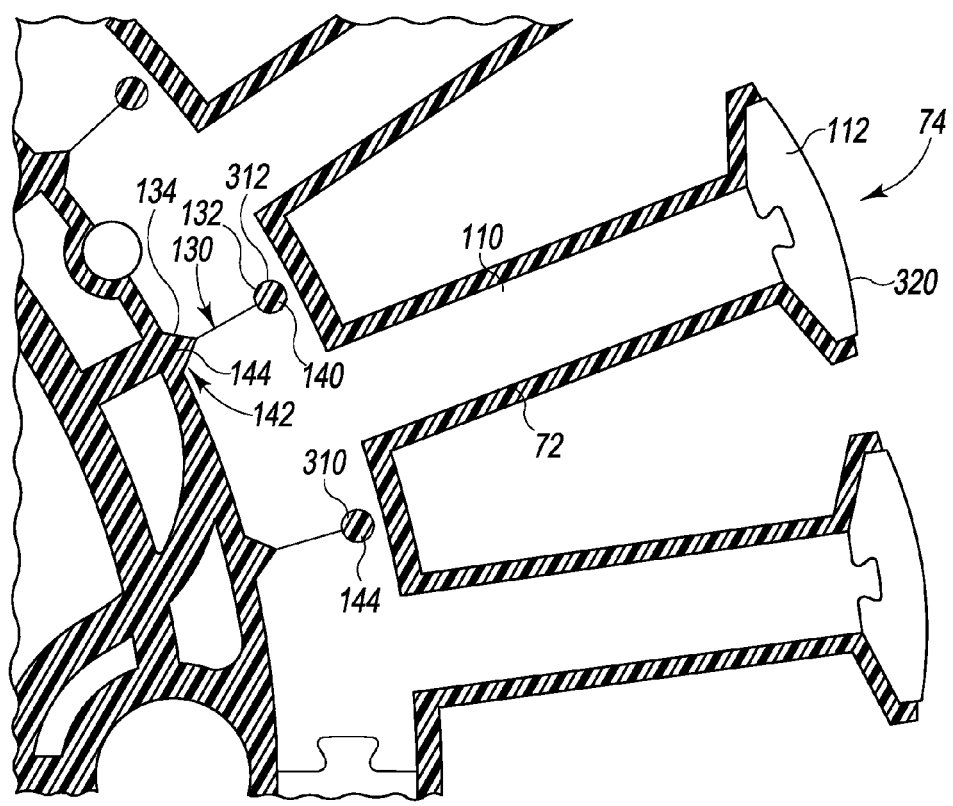
FIG. 10 is a partial cross-sectional side elevation view of the stator FIG. 2.

After the end pieces 112 are secured to the stator core 74, the shell 72 may be formed over the assembled structure. In the illustrative embodiment, the shell 72 is molded over the yoke 120 and the teeth 110 in an injection molding process. To do so, the stator core 74 may be placed in a mold. A polymeric or plastic material is injected into the mold and flows over the stator core 74. When the material cools, the central hub 80 and the casing 82 are formed over the yoke 120 and the teeth 110, thereby securing the shell 72 to the stator core 74, as shown in FIG. 10.

As the polymeric material is injected into the mold, the material flows into the passageways 140, 142 defined in the yoke 120 of the stator core 74. In that way, the support beams 144 of the shell 72 are formed. As shown in FIG. 10, the support beams 144 extend through the passageways 140, 142. In the passageways 140, a number of cylindrical support beams 310 are formed. In each passageway 142, a support beam 312, which has a triangular cross-section, is formed in the yoke 120. The support beams 310, 312 of the shell 72 fill the entire volume of the passageways 140, 142, thereby increasing the stiffness and strength of the stator 52.

Figure 11:
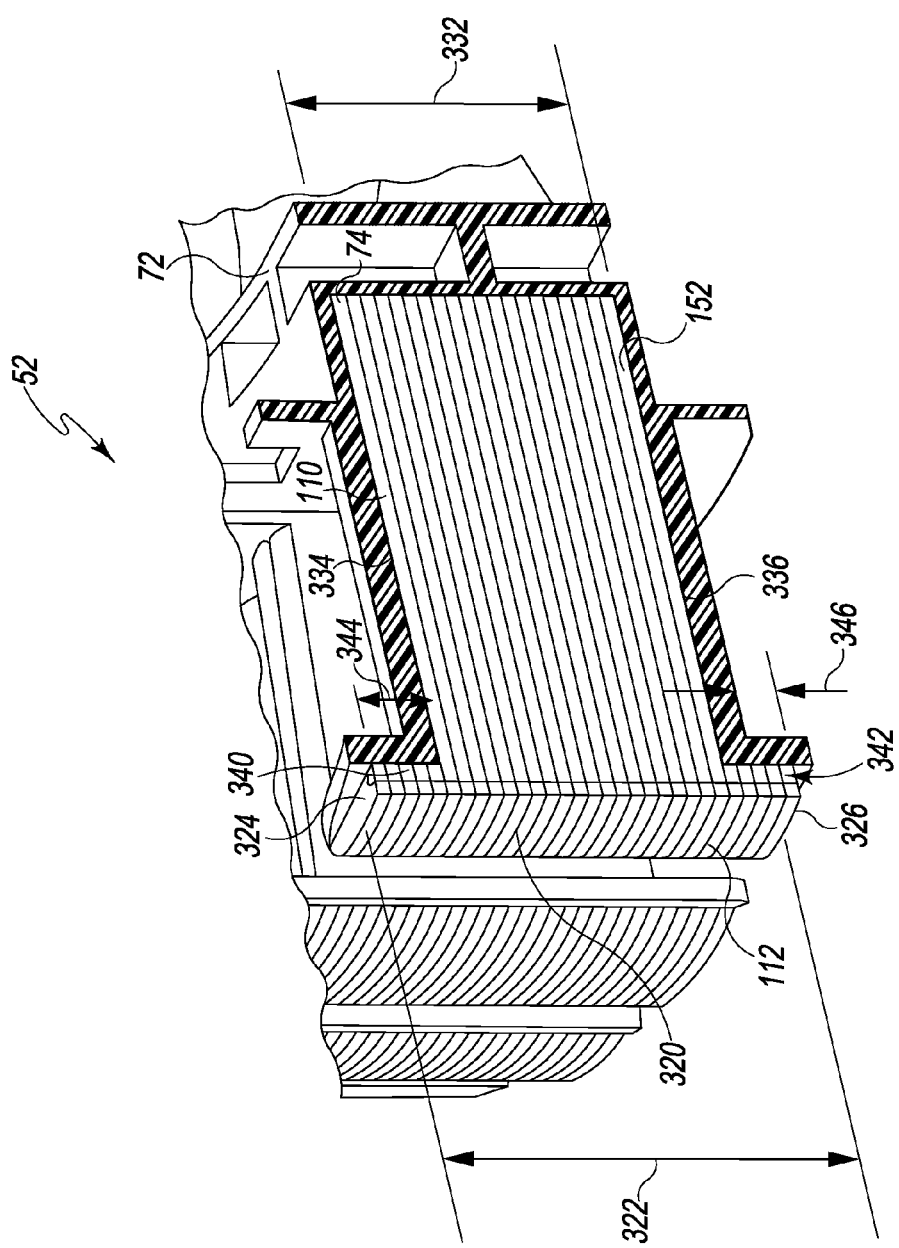
FIG. 11 is a partial cross-sectional perspective view of the stator of FIG. 2.

As shown in FIG. 1, each end piece 112 of the stator 52 has an outer face 320 that extends outward from the opening 108 of each casing 82 of the shell 72. The outer face 320 of each end piece 112 confronts the permanent magnets 66 secured to the rotor 50. During operation, magnetic flux generated by the stator 52 is transferred to the permanent magnets 66 via the end pieces 112, thereby causing the rotor 50 to rotate about the rotational axis 40. Each end piece 112 has a length 322 (see FIG. 11) defined between an end 324 and an end 326 along the longitudinal axis 76 of the stator 52. In the illustrative embodiment, the length 322 of the end piece 112 corresponds to the length 330 of the permanent magnets 66. Because the end piece 112 is assembled from a plurality of laminations 240, the length 322 of the end piece 112 may be adjusted independently of the length 330 of the permanent magnets 66 so that the length 322 may be increased or decreased to partially or completely match the length 330 of the permanent magnets 66.

The stator core 74 and the teeth 110 of the stator 52 have a length 332 that is defined between a substantially planar surface 334 and another substantially planar surface 336 along the longitudinal axis 76 of the stator 52. As shown in FIG. 10, the length 322 of each end piece 112 is greater than the length 332 of each tooth 110. A ratio is defined between the length 322 and the length 332 such that if the length 322 of the end piece 112 is increased, the length 332 of the tooth 110 may be increased by a corresponding amount. In the illustrative embodiment, the ratio defined between the length 322 and the length 332 has a magnitude of approximately 0.675. In other words, the length 332 of each tooth 110 a fraction of the length 322 of the end piece 112. In other embodiments, the magnitude of the ratio between the length 322 and the length 332 may be in the range of 0.4 to 0.9.

Because the length 332 of each tooth 110 is less than the length 322 of each piece 112, each end piece 112 has a pair of flanges 340, 342 that extend beyond the surfaces 334, 336, respectively, of each tooth 110. Each of the flanges 340, 342 extends distances 344, 346, respectively, beyond the surfaces 334, 336. The distance 344 is defined between the end 324 of the end piece 112 and the surface 334 of the tooth 110. The distance 346 is defined between the end 326 of the end piece 112 and the surface 336 of the tooth 110. In the illustrative embodiment, the distances 344, 346 are substantially equal such that the flanges 340, 342 extend symmetrically from the end 186 of the tooth 110. It should be appreciated that in other embodiments the flanges may be asymmetrical.

In operation, the flanges 340, 342 of each end piece 112 collect additional magnetic flux to improve flux transference between the rotor 50 and the stator 52 without an increase the overall thickness of the stator core 74. In other words, the larger length 322 of each end piece 112 permits the stator core 74 to remain smaller without a corresponding loss of efficiency. Additionally, because the end piece 112 is manufactured separately from the stator core 74, the dimensions of the end piece 112 can be changed as desired. For example, in addition to increasing the length of the end piece, the width of the end piece may also be increased, thereby permitting more magnetic flux to pass from the magnets to stator.

Figure 12:
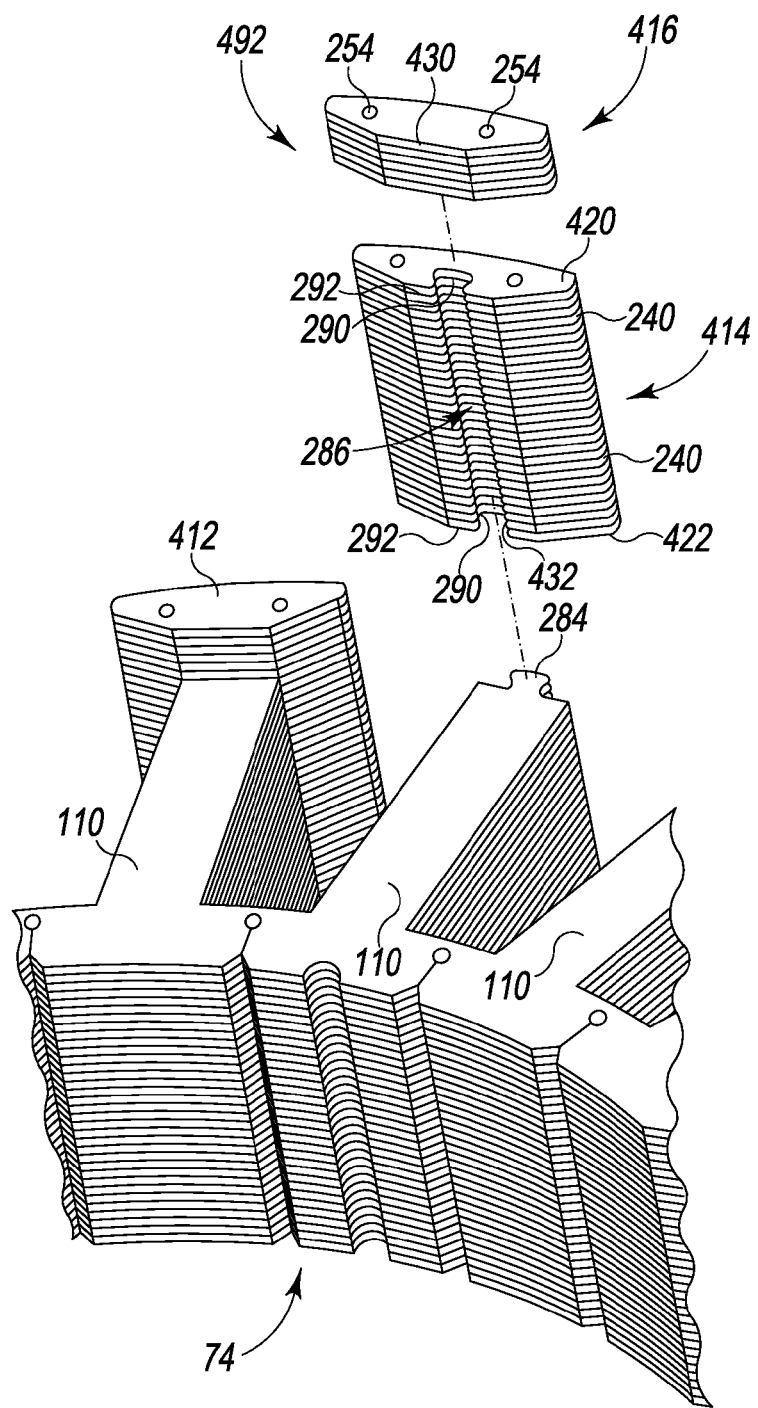
FIG. 12 is an exploded perspective view showing the stator core of FIG. 3 with another embodiment of an end piece.

Referring now to FIG. 12, the each tooth 110 of the stator core 74 has another embodiment of an end piece (hereinafter end piece 412) secured thereto. The end piece 412 includes a body 414 and a cap 416 secured to the body 414. As described in greater detail below, the cap 416 is configured to be secured to the end 420 of the body 414 to position the end piece 412 on the tooth 110.

The body 414 of each end piece 412, like the end piece 112 of FIGS. 1-11, is formed from a plurality of stacked laminations 240. Each lamination 240 of the body 414 is formed from a metallic material, such as, for example, steel, and may be produced via a progressive stamping process. In the illustrative embodiment, each lamination 240 has an oblong shape. In other embodiments, each lamination 240 may have a substantially rectangular, oval, or other suitable geometric shape.

Each lamination 240 of the body 414 has a slot 290 defined in one side 292 thereof. As shown in FIG. 12, the slots 290 of the laminations 240 are aligned to form a trapezoidal-shaped channel 286 when the body 414 is assembled. Each lamination 240 also includes a locking mechanism (not shown) that is configured to secure one lamination 240 to another lamination 240.

The cap 416 of the end piece 412 is also formed from a plurality of stacked laminations 430. Each lamination 430 is formed from a metallic material, such as, for example, steel, and may be produced via a progressive stamping process. Each lamination 430 also includes a locking mechanism 252 that is configured to secure one lamination 430 to another lamination 430. In the illustrative embodiment, the locking mechanism 252 includes a pair of tabs 254 that extend from one lamination and are received in a pair of apertures (not shown) defined in another lamination.

During assembly, the cap 416 is secured to the end 420 of the body 414 of the end piece 412. To do so, the tabs 254 of the body 414 may be advanced into the apertures (not shown) defined in the lower-most lamination 430 of the cap 416. The end piece 412 may then be positioned above the stator core 74. After aligning the channel 286 of the body 414 with a pin 284 of a tooth 110 of the stator core 74, the end piece 412 may be advanced downward. As the end piece 412 is moved downward, the lower opening 432 of the channel 286 is positioned over the pin 284 of the tooth 110.

The end piece 412 may continue to be advanced downward until the cap 416 engages the pin 284 of the tooth 110. In that way, the cap 416 acts as a position limit for the end piece 412 to properly position the end piece 412 on the stator core 74. It should be appreciated that in other embodiments the configuration of the dovetail joint may be reversed with the channels defined in the teeth of the stator core and the pins may extend from the end pieces.

Figure 13:
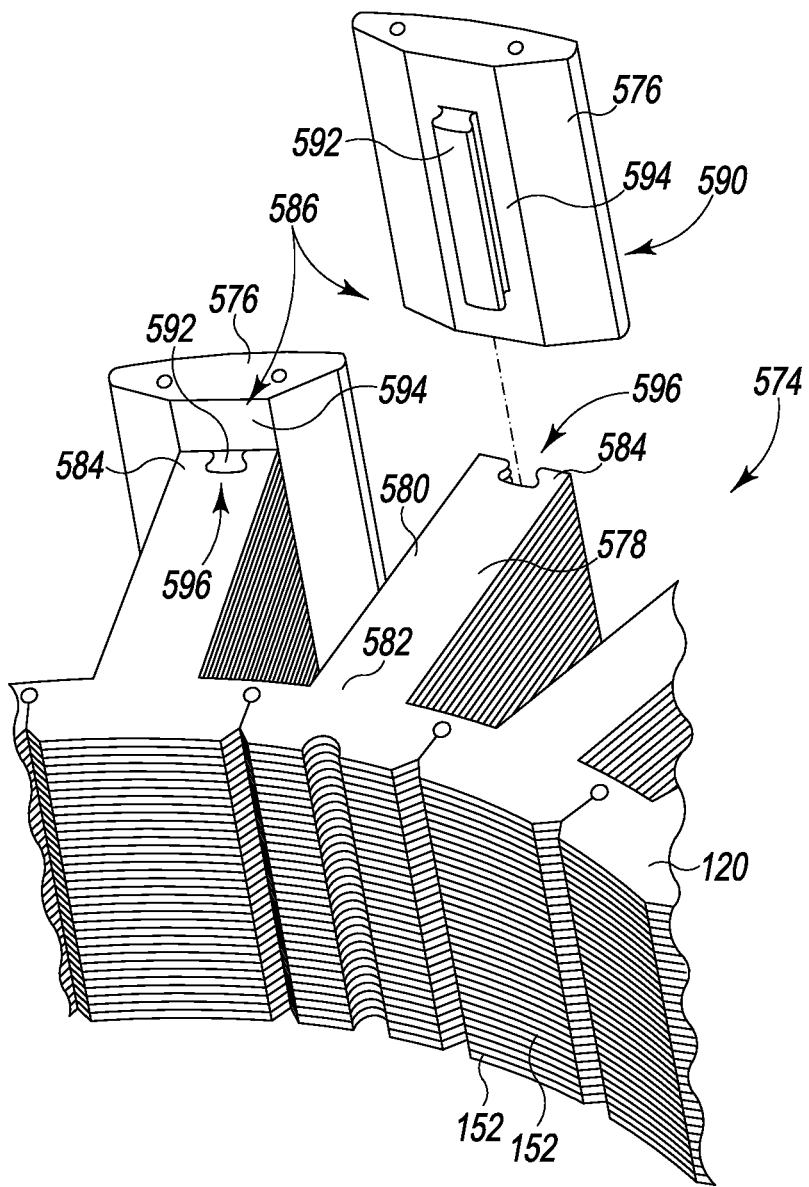
FIG. 13 is an exploded perspective view showing another embodiment of a stator core with another embodiment of an end piece.

Referring now to FIG. 13, another embodiment of a stator core (hereinafter stator core 574) with another embodiment of an end piece (hereinafter end piece 576) is shown. Some features of the embodiment illustrated in FIG. 13 are substantially similar to those discussed above in reference to the embodiments of FIGS. 1-12. Such features are designated in FIG. 13 with the same reference numbers as those used in FIGS. 1-12.

The stator core 574 has a plurality of teeth 578 that extend outwardly from a yoke 120. As described above, it should also be appreciated that in other embodiments the teeth 578 may extend inward from the yoke 120. Each tooth 578 includes an arm 580 extending from an end 582 attached to the yoke 120 to an end 584. The tooth head or end piece 576 of each tooth 578 is secured to the end 582. In the illustrative embodiment of FIG. 13, the end pieces 576 are formed separately from the stator core 574 and later attached to the ends 584 of the arms 580 via a locking mechanism 586, as described in greater detail below.

The stator core 574, like the stator core 74 of FIGS. 1-12, is formed from a plurality of stacked laminations 152 and may be produced in a manner similar to that described above in regard to the stator core 74. Each end piece 576 is separately formed as a single monolithic component. In the illustrative embodiment, the end piece 576 is formed from a soft magnetic composite (SMC) material, such as, for example, Somaloy 500, which is commercially available from Hoganas A B, Sweden. It should be appreciated that in other embodiments the end piece may be manufactured from other materials having ferromagnetic properties, such as, for example, steel.

As described above, each end piece 576 is secured to each tooth 578 of the stator core 574 via a locking mechanism 586. Each locking mechanism 586 is a dovetail joint 590 that secures the end piece 576 to the tooth 578. The joint 590 includes a pin 592 that extends outwardly a side wall 594 of the end piece 576. As shown in FIG. 9, the pin 592 has a trapezoidal shape. Each locking mechanism 586 also includes a corresponding trapezoidal-shaped channel 596 defined in the end 582 of each tooth 578. In the illustrative embodiment, the end piece 576 is secured to stator core 574 via a press fit. In other embodiments, each end 584 of each tooth 578 may be compressed inward to clamp onto the pin 592 of the end piece 576, thereby eliminating clearance between the pin 592 and the tooth 578 as well as reducing vibration in the stator assembly. It should be appreciated that in other embodiments the configuration of the dovetail joint may be reversed with the pins extending from the teeth of the stator core and the channels defined in the end pieces.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A stator for an electric motor, comprising:
a stator core comprising a yoke and a plurality of arms extending radially from the yoke, and
an end piece secured to a radial end of each arm of the stator core, each end piece comprising a first plurality of stacked laminations that form a body, the body having a channel defined in a first side wall,
wherein (i) the stator core has a length defined along a longitudinal axis of the stator, the length of the stator core being defined between a first substantially planar surface and a second substantially planar surface, and (ii) each end piece has a length defined along the longitudinal axis of the stator, the length of each end piece being defined between a first end and a second end, the length of each end piece being greater than the length of the stator core,
wherein each arm of the stator core includes (i) an end wall extending between the first substantially planar surface and the second substantially planar surface, and (ii) a protrusion extending from the end wall, the protrusion being received in the channel defined in the corresponding end piece, and
wherein each end piece includes a cap secured to the body, the cap of each end piece being formed from a second plurality of stacked laminations and having a first end that (i) covers an open end of the channel and (ii) contacts the protrusion of the stator core.

2. The stator of claim 1, wherein a ratio is defined between the length of the stator core and the length of the end piece, and the ratio has a magnitude between 0.4 and 0.9.

3. The stator of claim 2, wherein the ratio has a magnitude of approximately 0.675.

4. The stator of claim 1, wherein:
a first distance is defined between the first substantially planar surface of the stator core and the first end of the end piece, and
a second distance is defined between the second substantially planar surface of the stator core and the second end of the end piece, the second distance being approximately equal to the first distance.

5. The stator of claim 1, wherein the channel of each end piece extends from the first end to the second end of each end piece.

6. The stator of claim 1, wherein the channel of each end piece and the protrusion of each arm have corresponding dovetail shapes.

7. The stator of claim 1, further comprising a polymeric shell extending over the stator core and the end pieces, wherein each end piece has a second side wall positioned opposite the first side wall extending from an opening defined in the polymeric shell.

8. The stator of claim 1, wherein the arms of the stator core extend radially outward from the yoke away from the longitudinal axis.

9. The stator of claim 1, wherein the arms of the stator core extend radially inward from the yoke toward the longitudinal axis.

10. The stator of claim 1, wherein the stator core comprises a plurality of laminations, each lamination including an annular plate having a plurality of protrusions extending therefrom, and
the annular plates of the laminations cooperate to define the yoke and the plurality of protrusions of each lamination cooperate with the plurality of protrusions of the other laminations to define the arms of the stator core.

11. The stator of claim 1, wherein a first distance is defined between the stator core and a first end of each end piece, and a second distance is defined between the stator core and a second end of each end piece, the second distance being less than the first distance.

12. A stator for an electric motor, comprising:

a stator core comprising (i) a yoke, and (ii) a plurality of arms extending radially from the yoke, each arm having a length defined between a first substantially planar surface and a second substantially planar surface, and an end piece secured to a radial end of each arm of the stator core, the end piece having a body formed from a soft magnetic composite material, wherein (i) each end piece has a first end positioned above the first substantially planar surface of each arm and a second end positioned below the second substantially planar surface of each arm, and (ii) each end piece has a length defined between the first end and the second end that is greater than the length of the each arm, wherein a first distance is defined between the first substantially planar surface of the stator core and the first end of the end piece, and a second distance is defined between the second substantially planar surface of the stator core and the second end of the end piece, the second distance being less than the first distance, wherein each end piece has a channel defined in a first side wall, and each arm of the stator core includes (i) an end wall extending between the first substantially planar surface and the second substantially planar surface, and (ii) a protrusion extending from the end wall, the protrusion being received in the channel defined in the corresponding end piece wherein each end piece includes a cap secured to the body, the cap of each end piece being formed from a second plurality of stacked laminations and having a first end that (i) covers an open end of the channel and (ii) contacts the protrusion of the stator core.

13. The stator of claim 12, wherein a ratio is defined between the length of the stator core and the length of the end piece, and the ratio has a magnitude between 0.4 and 0.9.

14. The stator of claim 12, further comprising a polymeric shell injection-molded to the stator core and the end pieces.

15. The stator of claim 12, wherein the arms of the stator core extend radially inward from the yoke toward a longitudinal axis.

\* \* \* \* \*